3,257,770
FEEDING AND CARTONING APPARATUS
Peter N. Blackman, Agincourt, Ontario, Canada, assignor to Canada Bread Company Limited, Ontario, Canada
Filed Nov. 16, 1962, Ser. No. 238,114
9 Claims. (Cl. 53—250)

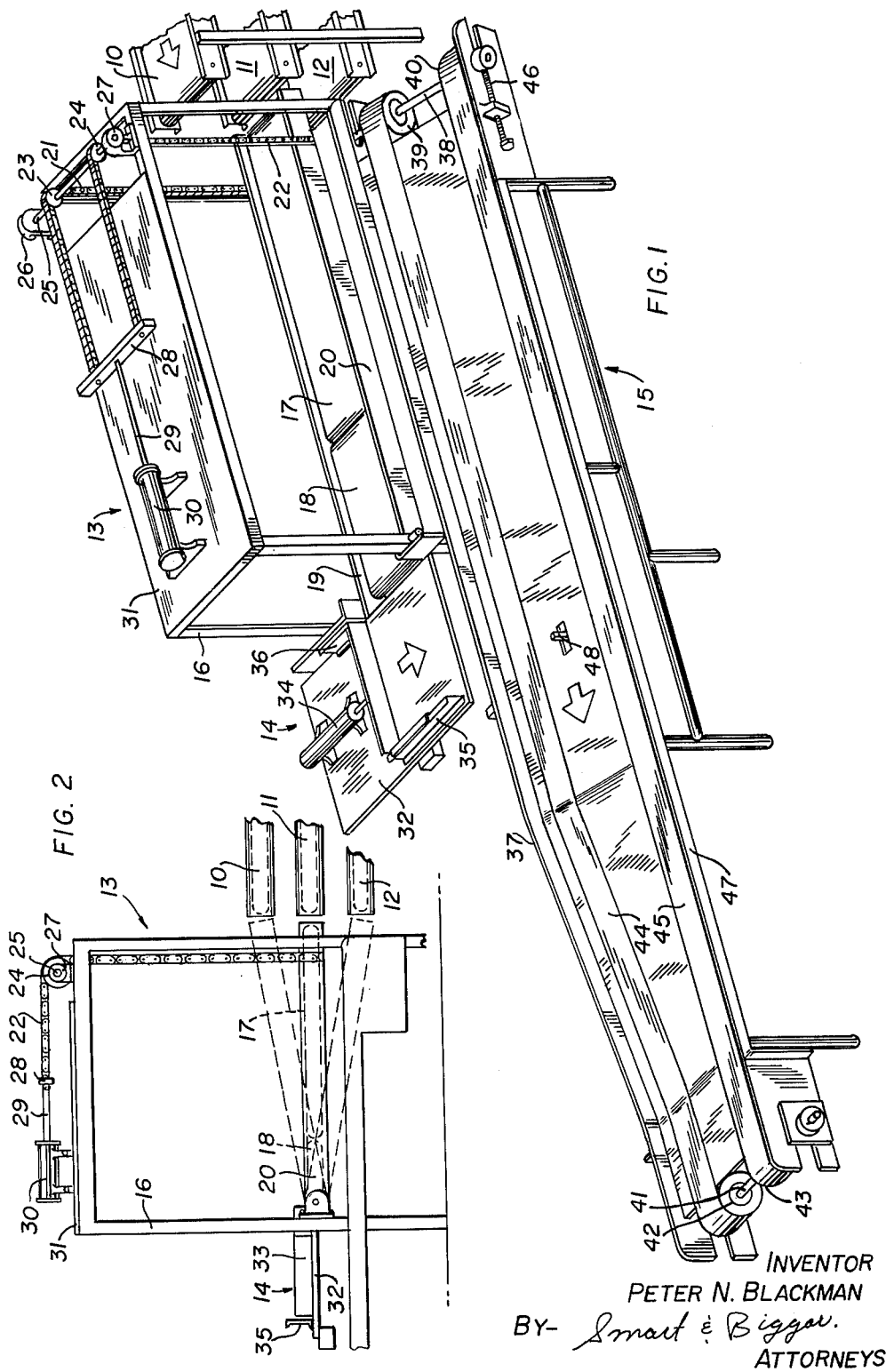

This invention relates to apparatus for advancing articles from a source to a station adapted to receive the articles and from a station in groups to a carton.

In cartoning articles which offer little resistance to deformation, it is difficult to orient them in a compact group having a predetermined number to form a single layer when the articles are being delivered continuously from a source. It is also difficult to stack such groups of articles in layers prior to their insertion into the receiving cartons. This is particularly true when packaging loaves of bread and like articles. Especially, it will be appreciated that lateral displacement of individual loaves to form a second layer of loaves on top of the first layer of loaves requires a complex arrangement of devices.

It is, therefore, an object of the present invention to provide an apparatus which will receive individual articles continuously emanating from a source and group a predetermined number of them in a single layer for deposition in a carton, without damage.

A further object of the invention is to provide an apparatus which will transfer grouped predetermined numbers of articles to an empty carton designed for the purpose, in succession layer upon layer within the carton.

In one aspect, the invention resides in an apparatus having a station for receiving a predetermined number of individual articles continuously emanating from a source, wherein conveying means are provided for advancing the articles from the source to the station, the conveying means being divided into an infeed section adjacent the source and an outfeed section adjacent the station. The outfeed section is adapted for intermittent operation whereby it may be rendered inoperative in response to said predetermined number of articles being received at the station notwithstanding continued operation of the infeed section to accept the continuous emanation of articles from the source.

In another aspect, the invention resides in an apparatus for loading articles into cartons from a loading station, wherein means are provided for conveying empty cartons in succession to a loading position adjacent the loading station in which position an empty carton is inclined whereby displacement of the articles into the carton is assisted by gravity.

The invention also resides in an apparatus having a loading station adapted to receive a predetermined number of articles continuously emanating from a source, wherein means are provided for conveying the articles from the source to the loading station, and means are also provided for advancing empty cartons to a loading poistion adjacent the loading station and for advancing loaded cartons from said position. The means for conveying articles has an infeed section adjacent the source and an outfeed section adjacent the loading station, the latter being adapted for intermittent operation so that it may be rendered inoperative during operation of an ejecting means at the station for displacing the articles into a carton, notwithstanding continued operation of the infeed section.

FIGURE 1 is a perspective view of a carton loading apparatus constructed in accordance with the invention; and FIGURE 2 is a side elevation of the carton loading apparatus of FIGURE 1 with certain parts deleted for clarity.

The carton loading apparatus is specifically adapted to load ten loaves of bread, five at a time, into a carton. The loaves are fed to the apparatus by any one of three feed conveyors 10, 11 or 12 which are vertically arranged in stacked relationship, that is, one over the other as shown. Adapted to receive the loaves from the feed conveyors is a bridging conveyor designated generally as 13 which advances the loaves to a loading station 14. By means of a carton conveyor 15, empty cartons are sequentially advanced to, and positioned adjacent, the loading station 14 for receiving the loaves therefrom. The bridging conveyor 13 consists of an open box-like framework 16 supporting a pair of driven conveyor belts 17 and 18 lying end to end and extending from the feed conveyors 10, 11 and 12 to the loading station 14. The conveyor belts 17 and 18, which comprise infeed and outfeed sections or belts of the bridging conveyor 13, are mounted in the usual fashion between a pair of side rails 19 and 20, and are arranged to be driven by suitable driving means (not shown). Outfeed belt 18 may be disconnected from the driving means so that it may be rendered inoperative from time-to-time notwithstanding continued operation of conveyor belt 17.

The side rails 19 and 20 are each pivotally connected to the framework 16 adjacent the station 14 and are suspended at their opposite ends by chains 21 and 22 which pass upwardly and over a pair of sprockets 23 and 24 on a shaft 25 which is rotatably mounted in bearings 26 and 27 at the top of the framework 16. From the sprockets, the chains 21 and 22 extend horizontally and are fixed at their ends to a bar 28 mounted transversely on the free end of a piston rod 29 of an air cylinder 30 mounted on a top plate 31 of the framework 16. Thus, by controlling the air supply to the cylinder 30, the ends of the side rails 19 and 20 may be raised or lowered to index or position the infeed belt 17 adjacent any one of the feed conveyors 10, 11 or 12 as more clearly shown in FIGURE 2. Because of the pivoted connection of the other ends of the side rails 19 and 20, the outfeed belt 18 remains adjacent the station 14 and, therefore, the belts 17 and 18 form a bridge between the station and any one of the feed conveyors.

The loading station 14 comprises in general a platform 32 for receiving loaves from the outfeed belt 18 and is equipped with a pusher 33 controlled by an air cylinder 34 for ejecting the loaves therefrom in the direction of the arrow to cartons on conveyor 15. The platform 32 is wide enough to receive five loaves of bread in contiguous side-by-side relationship and carries, on its edge remote from the bridging conveyor 13, a rail 35 to prevent the loaves from being forced off the platform. Attached to and extending rearwardly of the pusher 33 is a guard rail 36 which extends transversely of the outfeed belt 18 where the pusher is activated to eject loaves, thus preventing loaves from being pushed onto platform 32 behind pusher 33.

The carton conveyor 15 has an elongated frame 37 extending substantially parallel to the bridging conveyor 13 on either side of the loading station 14. Rotatably supported at the right-hand end of the frame 37, with its axis inclined downwardly and away from the loading station 14, is a shaft 38 having mounted thereon a pair of flat pulleys 39 and 40. A similar shaft 41 having flat pulleys 42 and 43 is rotatably mounted horizontally at the other end of the frame 37. A pair of continuous belts 44 and 45 extend around pulleys 39, 42 and 40, 43, respectively, and are driven by suitable driving means (not shown) connected to one of the shafts 38 or 41. Tensioning means 46 associated with shaft 38 maintains the desired tension in the belts 44 and 45.

The width of frame 37 is such as to accommodate the required cartons disposed therein with their open ends facing the loading station 14. The upper plane of belts 44, 45 is inclined downwardly away from platform 32, from shaft 38 at least as far as the packaging station and thereafter the plane gradually becomes horizontal. Thus, the cartons are fed past the loading station from right to left in the direction of the arrow as shown in FIGURE 1, and are inclined to the horizontal so that the loaves are assisted by gravity in sliding into the carton. An upstanding flange 47 on the lower edge of the frame 37 prevents the cartons from sliding laterally off the carton conveyor. The height of the carton conveyor at the packaging station is arranged to suit a particular arrangement of ten loaves in two layers of five in the cartons. Thus, the lower edge of the open end of a carton is disposed below the platform 32 so that the second five loaves may slide into the carton on top of the first layer. In the middle of the frame 27 at the loading station 14 is a depressable stop 48 which positions each carton opposite platform 32.

The apparatus operates as follows: Assuming that loaves from feed conveyor 11 are to be cartoned, the air cylinder 30 is operated to locate the side rails 19 and 20 of the bridging conveyor 13 as shown in the solid line position of FIGURE 2, in which position the infeed belt 17 is in line with conveyor 11. An empty carton is placed on the right hand end of carton conveyor 15 with its open end facing bridging conveyor 13. Conveyor 15 is then operated to advance the carton to a loading position opposite the loading station 14.

Feed conveyor 11, infeed belt 17 and outfeed belt 18 are activated and loaves are thereby advanced to the loading station 14. As each loaf arrives at the station 14, it urges the preceding loaves further onto platform 32 of the loading station until five loaves are disposed thereon with the foremost loaf positioned against the rail 35. The outfeed belt 18 is then disconnected from its drive means and the pusher 33 is activated by the air cylinder 34 to push the loaves into the positioned carton. Infeed belt 17 continues to feed loaves from the feed conveyor 11 to the outfeed belt 18 but since the latter is disconnected from its drive means no positive feed is made to the loading station 14. The guard rail 36 on the pusher 33 ensures that the loaves are not pushed onto the platform 32 behind the pusher 33.

When the first five loaves have been ejected into the carton, the pusher 33 is retracted and the outfeed belt 18 is again connected to the driving means to feed another five loaves to the platform 32 whereafter the same sequence is followed, the second group of five loaves being pushed into the carton on top of the first layer of loaves.

At the termination of the second ejection and retraction of the pusher 33, the stop 48 of the carton conveyor is depressed and the conveyor is activated to advance the full carton beyond the loading station 14 and to position a new empty carton opposite platform 32 for receiving loaves. The cycle is then repeated.

It can be seen from the broken line positions of the infeed belt 17 and outfeed belt 18 of the bridging conveyor 13 that loaves may be received by the loading station 14 from three sources through conveyors 10, 11 and 12. Selection of the desired source may be made manually or automatically in a given sequence as desired by controlling the air supply to cylinder 30 as aforesaid.

What I claim as my invention is:

1. An apparatus specifically adapted to receive individual articles from a plurality of sources vertically arranged in stacked relationship and to load groups of the articles in cartons, comprising a loading station for receiving a predetermined number of the articles, first conveying means for advancing the articles from the source to the loading station and being adapted to be indexed to any one of the sources, second conveying means for advancing empty cartons in succession to a loading position adjacent the loading station, and ejecting means at the loading station adapted to displace said predetermined number of articles therefrom into a carton positioned adjacent said station, the first conveying means having an infeed section adjacent the source and an outfeed section adjacent the loading station, the infeed section being adapted for continuous operation and the outfeed station being adapted for intermittent operation, said outfeed section being adapted to be rendered inoperative during operation of the ejecting means, the second conveying means being adapted to advance a loaded carton from said position adjacent the loading station.

2. In an apparatus having a station for receiving a predetermined number of individual articles from any one of a plurality of sources vertically arranged in stacked relationship, the combination comprising conveying means for advancing articles from the sources to the station, and means operatively associated with the conveying means for indexing the latter to the separate sources, said conveying means having an infeed section adjacent the source and an outfeed section adjacent the station, the infeed section being adapted for continuous operation and the outfeed section being adapted for intermittent operation, said outfeed section being adapted to be rendered inoperative in response to said predetermined number of articles being received at the station, said source and said conveying means and said station all being positioned in linear sequence.

3. In an apparatus having a station for receiving a predetermined number of individual articles from any one of a plurality of sources vertically arranged in stacked relationship, the combination comprising conveying means having one end adjacent the station and the other end adjacent the sources, means pivotally supporting said one end, and indexing means connected to said other end and being adapted to pivot the conveying means about the first-mentioned means to position said other end at the separate sources whereby the conveying means is positionable to advance articles from any one of the sources to the station, said conveying means having an infeed section adjacent the source and an outfeed section adjacent the station, the infeed section being adapted for continuous operation and the outfeed section being adapted for intermittent operation, said outfeed section being adapted to be rendered inoperative in response to said predetermined number of articles being received at the station, said source and said conveying means and said station all being positioned in linear sequence.

4. The combination as defined in claim 3 wherein the indexing means comprises a flexible member connected to said other end of the conveying means and extending upwardly therefrom, and means operatively connected to said member and adapted to move the latter vertically.

5. The combination as defined in claim 4 wherein the flexible member is a chain and the means operatively connected thereto is a fluid-pressure cylinder.

6. An apparatus as defined in claim 1 wherein there is provided indexing means operatively associated with the first conveying means for shifting the latter to any one of the sources.

7. An apparatus as defined in claim 6 wherein there is provided bearing means pivotally supporting the conveying means at its one end adjacent the loading station, the indexing means being connected to the other end adjacent the sources.

8. In an apparatus having a station with a platform for receiving a predetermined number of individual articles continuously emanating from a source, means disposed at said station for delivering the predetermined number of articles to a carton, and conveying means for advancing the articles from the source to the platform, said conveying means having an infeed section adjacent the source and an outfeed section immediately adjacent the platform, the infeed section being adapted for continuous operation and the outfeed section being adapted for intermittent operation, said outfeed section being adapted for continuous operation while said platform receives successively each of said predetermined number of articles and being adapted to be rendered inoperative in response to said predetermined number of articles being received on the platform.

9. An apparatus for receiving individual articles continuously emanating from a source and for loading groups of the articles in cartons, comprising a loading station for receiving a predetermined number of the articles, first conveying means for advancing the articles from the source to the loading station, second conveying means for advancing empty cartons in succession to a loading poistion adjacent the loading station, and ejecting means at the loading station adapted to displace said predetermined number of articles therefrom into a carton positioned adjacent said station, the first conveying means having an infeed section adjacent the source and an outfeed section adjacent the loading station, the infeed section being adapted for continuous operation and the outfeed section being adapted for intermittent operation, said outfeed section being adapted to be rendered inoperative during operation of the ejecting means, said second conveying means being adapted to incline an empty carton at the loading station with its open end facing said station and the lower edge of its open end disposed whereby a first group of the predetermined number of articles may be assisted in their displacement into said carton by gravity, and a second group of the predetermined number of articles may be superimposed on said first group and being adapted to advance a loaded carton from said position adjacent the loading station.

References Cited by the Examiner

UNITED STATES PATENTS

| | | | |
|---|---|---|---|
| 2,109,294 | 2/1938 | Kimball et al. | 53—164 X |
| 2,644,626 | 7/1953 | Britt | 53—61 |
| 2,971,309 | 2/1961 | Miskel et al. | 53—251 X |

FOREIGN PATENTS

| | | |
|---|---|---|
| 525,101 | 5/1956 | Canada. |
| 715,134 | 9/1954 | Great Britain. |

TRAVIS S. McGEHEE, *Primary Examiner.*

A. E. FOURNIER, *Assistant Examiner.*